No. 818,956. PATENTED APR. 24, 1906.
W. A. HALL, Sr.
COMBINED POTATO AND CORN PLANTER.
APPLICATION FILED JUNE 27, 1905.

6 SHEETS—SHEET 2.

WITNESSES:
Jos. A. Ryan
Edw. W. Byrn.

INVENTOR
William A. Hall Sr.
BY Munn & Co.
ATTORNEYS

No. 818,956.  PATENTED APR. 24, 1906.
W. A. HALL, Sr.
COMBINED POTATO AND CORN PLANTER.
APPLICATION FILED JUNE 27, 1905.

6 SHEETS—SHEET 3.

WITNESSES:
Jos. A. Ryan
Edw. W. Byrn

INVENTOR
William A. Hall Sr.
BY Munn & Co.
ATTORNEYS

No. 818,956. PATENTED APR. 24, 1906.
W. A. HALL, Sr.
COMBINED POTATO AND CORN PLANTER.
APPLICATION FILED JUNE 27, 1905.

6 SHEETS—SHEET 4.

WITNESSES:
Jos. A. Ryan
Edw. W. Byrn.

INVENTOR
William A. Hall Sr.
BY Munn & Co.
ATTORNEYS

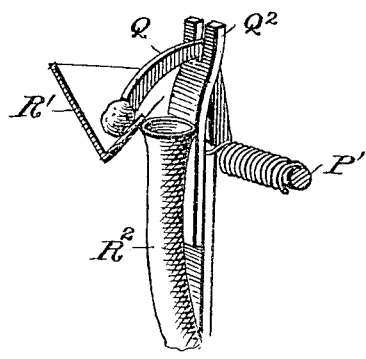
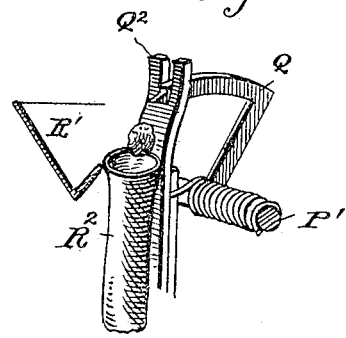
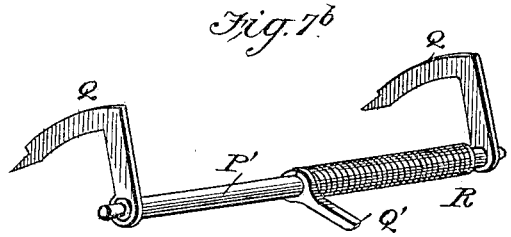
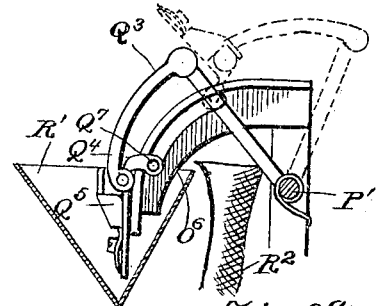
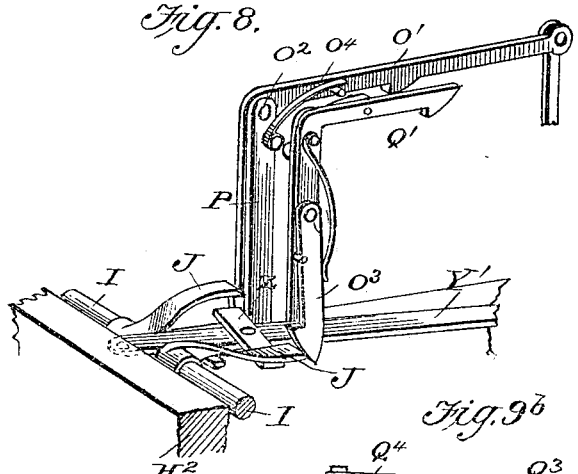
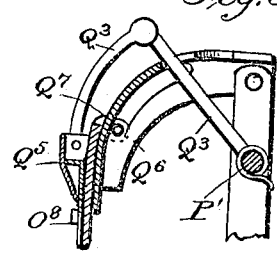
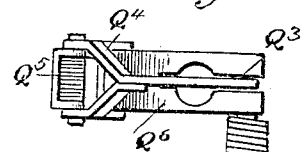

No. 818,956. PATENTED APR. 24, 1906.
W. A. HALL, Sr.
COMBINED POTATO AND CORN PLANTER.
APPLICATION FILED JUNE 27, 1905.

6 SHEETS—SHEET 6.

Fig. 20.

WITNESSES:
Jos. A. Ryan
Edw. W. Byrn.

INVENTOR
William A. Hall Sr.
BY Munn & Co
ATTORNEYS

UNITED STATES PATENT OFFICE.

WILLIAM A. HALL, SR., OF PARDEEVILLE, WISCONSIN.

COMBINED POTATO AND CORN PLANTER.

No. 818,956.  Specification of Letters Patent.  Patented April 24, 1906.

Application filed June 27, 1905. Serial No. 267,247.

*To all whom it may concern:*

Be it known that I, WILLIAM A. HALL, Sr., a citizen of the United States, residing at Pardeeville, in the county of Columbia and State of Wisconsin, have invented a new and useful Improvement in a Combined Potato and Corn Planter, of which the following is a specification.

My invention is in the nature of a novel check-row planter designed more especially for planting potatoes, but applicable also with slight modification to planting corn or other seed.

My device is designed to plant two or more rows at a time, and to check-row them or aline the hills both ways, and to drop one potato or piece of potato in a hill, and to adjust the distance between the rows and also the space between the hills in the row.

My invention consists in the novel construction and arrangement of parts, which will be hereinafter fully described with reference to the drawings and then pointed out in the claims.

Figure 1:
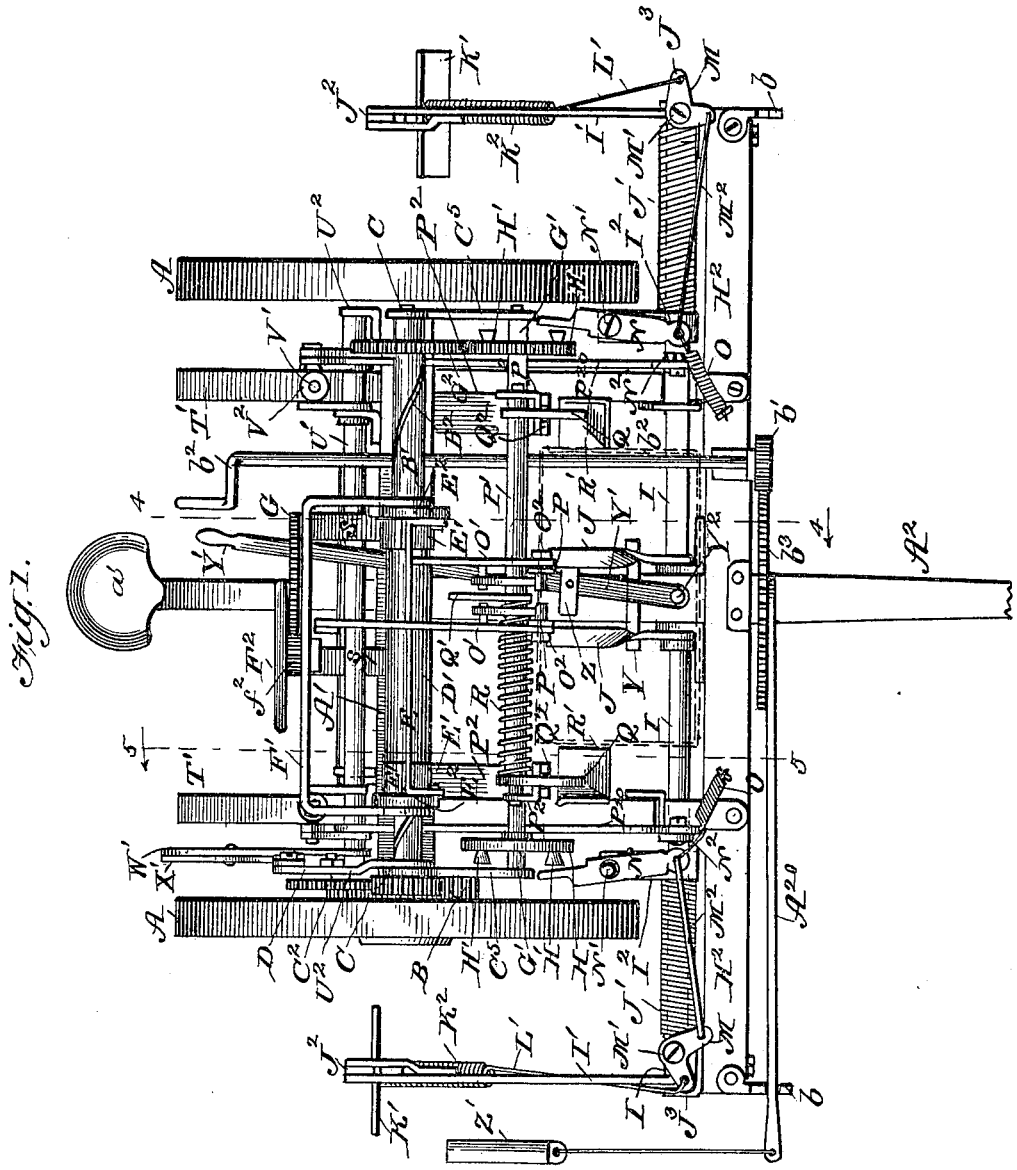
Figure 2:
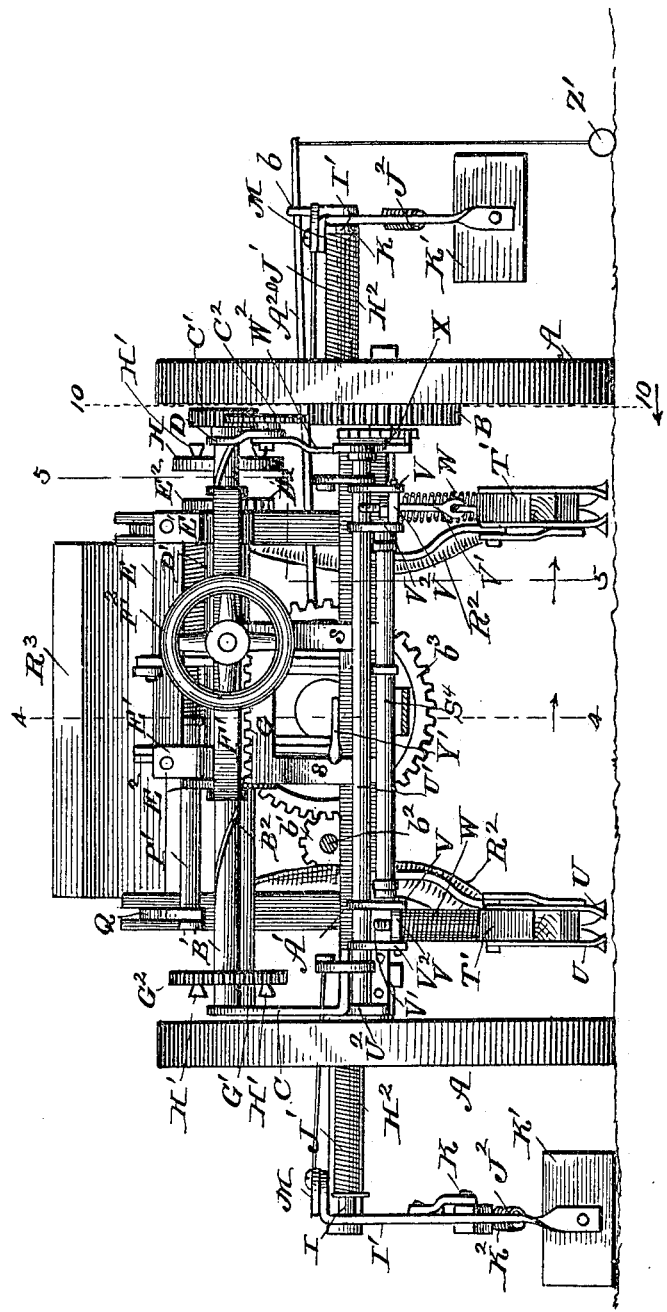
Figure 3:
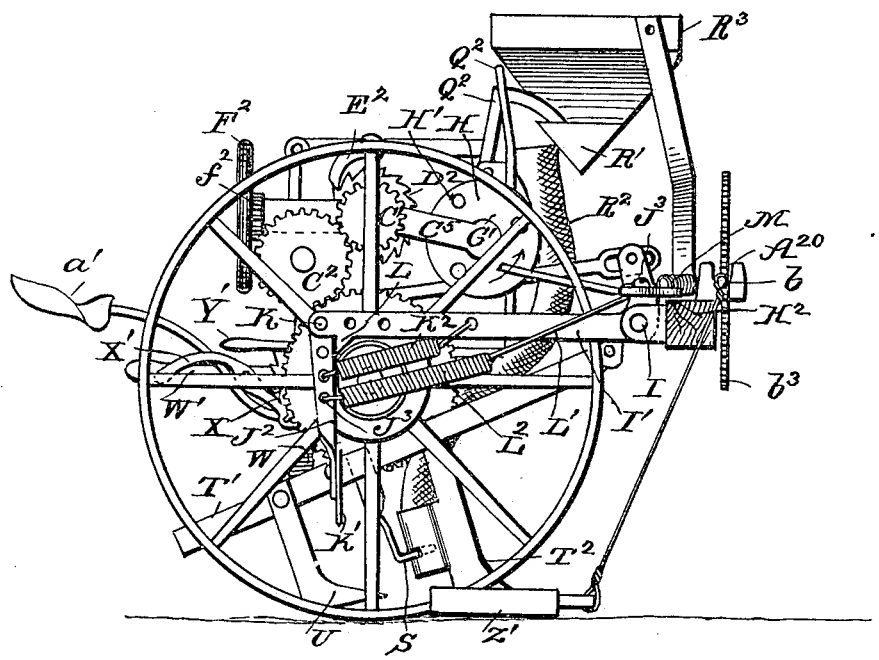
Figure 6:
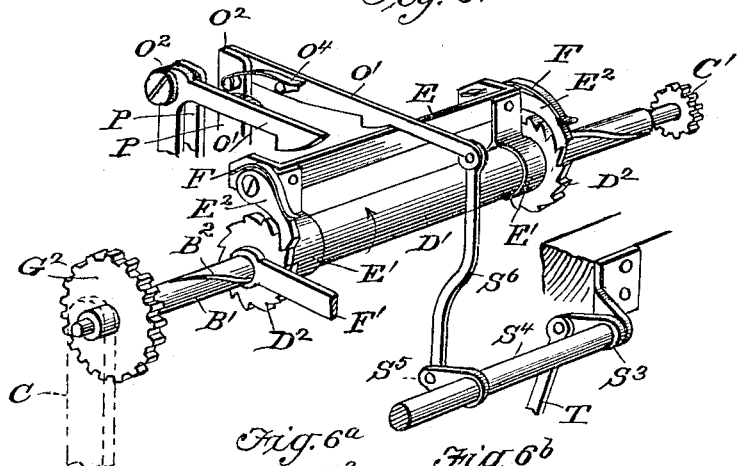
Figures 6A, 6B:
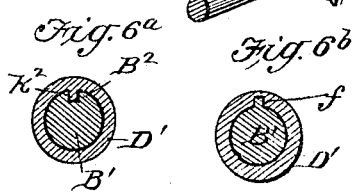
Figure 4:
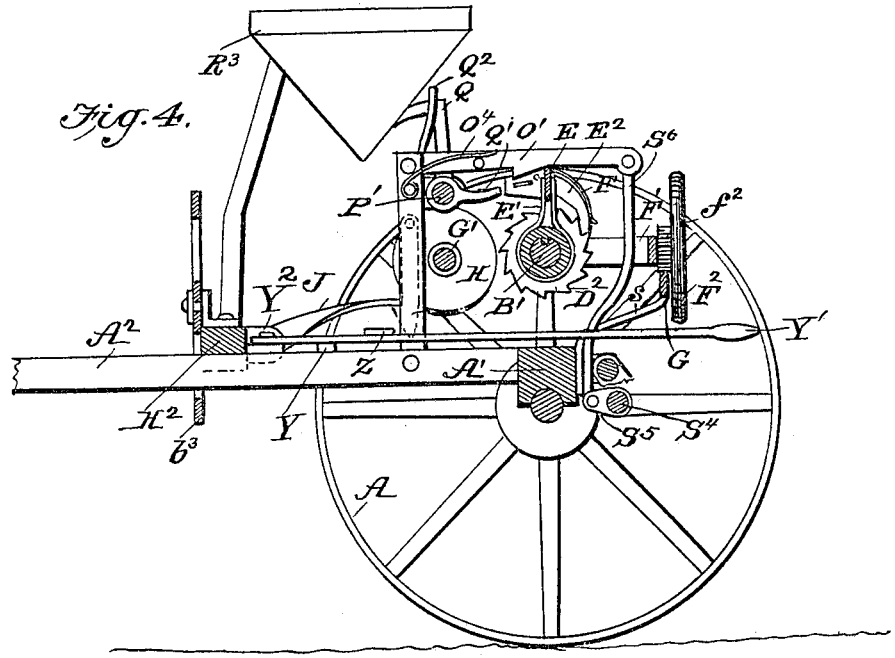
Figure 5:
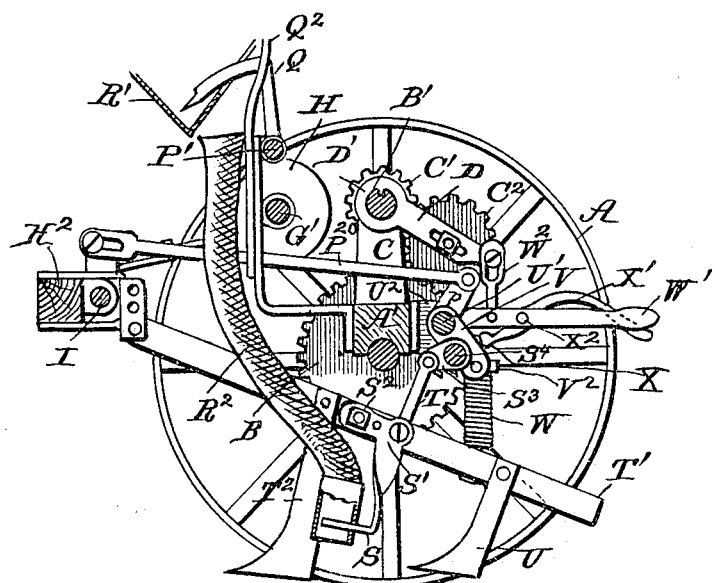

Figure 1 is a top plan view with the main hopper removed and its position shown in dotted lines. Fig. 2 is a rear elevation. Fig. 3 is a side elevation from the right-hand side of Fig. 2. Fig. 4 is a vertical section taken transversely to the axle on the line 4 4 of Figs. 1 and 2. Fig. 5 is a vertical section taken transversely to the axle on line 5 5 of Figs. 1 and 2 looking in the direction of the arrow. Fig. 6 is a perspective view of the revolving paddle and its mechanism for imparting an intermittent action to the dropping and marking devices. Fig. $6^a$ is a cross-section through the grooved shaft and spirally-adjustable sleeve of Fig. 6. Fig. $6^b$ is a similar view of a modified form of these parts. Figs. 7, $7^a$, and $7^b$ are detail views in perspective of the potato-dropping mechanism. Fig. 8 is a perspective view of the devices for alternately operating the marking devices on opposite sides of the machine. Fig. 9 is a side view of the corn-dropping mechanism. Fig. $9^a$ is a vertical section, and Fig. $9^b$ a top plan view, of the same; and Fig. 10 is a vertical transverse section on line 10 10 of Fig. 2 looking in the direction of the arrow.

Referring to Figs. 1, 2, 4, A A are the wheels, A' the axletree, and $A^2$ is the tongue of the vehicle which carries the machine. B is the drive-wheel, which is a toothed gear concentrically fastened to one of the wheels of the vehicle, preferably the right-hand one.

B', Figs. 1, 2, 5, and 6, is a shaft which is arranged parallel to and above the axletree and has a spiral groove or key-seat $B^2$ cut in at its surface throughout its full length.

C C are standards rising from the axletree and supporting the shaft B', and C', Figs. 5 and 6, is a gear-wheel made fast to one end of the shaft. Different sizes of this wheel C' can be used to cause different widths of planting cross-rows or hills in the same row. C is an intervening gear-wheel adjustable on slotted arm D to accommodate different sizes of gear-wheel C'. The wheel $C^2$ is used to convey power and motion from drive-wheel B to gear-wheel C'.

D', Figs. 1, 2, 6, is a horizontal tube or sleeve, to the ends of which ratchet-wheels $D^2 D^2$ are rigidly fastened. This sleeve is made to slide longitudinally on shaft B' and has keys $k^2$, Fig. $6^a$, at each end which fit into spiral key-seats $B^2$ of shaft B', so that when moved along on shaft B' it will turn with the key-seat $B^2$ around shaft B' and when not slid on the shaft it rotates with the shaft.

E, Figs. 2, 4, 6, is a horizontal tappet bar or paddle which is loosely fastened to tube D' with clasps E' E', which permit it to turn on tube D'. $E^2 E^2$ are pawls fastened to the ends of paddle E and are made to engage ratchet-wheels $D^2 D^2$ and are held in position by springs F F, so that paddle E is carried around with the ratchet-wheels $D^2 D^2$ in normal revolution, but may be adjusted around independent of them.

F', Figs. 1, 2, 4, 6, is a bail-shaped frame, both ends of which are made to embrace and slip on shaft B' at the ends of sleeve D' and when pushed along on shaft B' carries with it sleeve D' and the other parts attached to it. When frame F' is pushed longitudinally on shaft B', said frame travels in a straight line; but sleeve D', paddle E, &c., turn forward or backward with the spiral key-seat $B^2$, according to which direction it is moved in.

$F^2$, Figs. 1, 2, 4, is a hand-wheel with small gear-wheel $f^2$ attached, both of which turn on a pin fastened to bail F'. This small gear-wheel works in the teeth of a horizontal rack-bar G, which is fastened to rearwardly-projecting arms *s* on the axletree A'.

G', Figs. 1, 3, 4, and 10, is a horizontal shaft supported by extensions $C^5$ of standards C C, projecting forwardly from the axletree. This shaft G' is geared to shaft B' by gear-wheels $G^2$ H, Fig. 1. There are two wheels H H arranged at opposite ends of shaft G', near the periphery of which are fastened laterally-projecting bevel-headed pins H' H'.

H², Fig. 1, is a front cross-bar forming one of the supports of the machine. I I are right and left horizontal shafts arranged in alinement with each other and pivoted and held in position by brackets fastened to the cross-bar H² immediately behind the same. One of these shafts with the parts attached is used in going across the field one way, and the other is used when going back. Each shaft has three rearwardly-projecting arms I', I², and J fastened to it at right angles, and each shaft has a rocking movement independent of the other, causing the rear ends of these arms I', I², and J to rise and fall.

J' J' (see Figs. 1 and 2) are spiral springs on shafts I I, to which springs the forward ends of arms I' are connected and around which shaft I the arms swing. When arms I', I², and J are raised, they work against these springs, putting them under tension, and when released the springs throw the arms down.

J² J², Figs. 1. 2, and 3, are downwardly-extending arms pivoted to the rear ends of arms I' I' at K K. To the lower ends of arms J² are fastened long hoe-blades K' K', whose planes are at right angles to the forward movement of the machine. K² K², Fig. 3, are springs connecting arms I' to J², and when arm J² is lifted above the ground and is free to act, as in Fig. 3, the spring K² pulls it against stop L on arm I'. L' is a rod which is joined to spring L² and connects arm J² to elbow-lever M, Fig. 1, which latter is fulcrumed at M' near the outer end of cross-bar H². M² is a rod which connects elbow-lever M to a lever N, which is fulcrumed at N' on rearwardly-extending arm I². This lever N has a vibrating horizontal movement, the forward end of which when at rest is held against stop N², Fig. 1, by spring O, and the rear end of which is acted upon by the pins of wheels H.

O' O', Figs. 1, 4, 6, and 8, are elbow-levers pivoted at O² O² to standards P P, rising from the tongue. The downwardly-projecting arms of these elbow-levers have a spring-latch O³, Fig. 8, pivoted to them to catch and hold the rear ends of arms J J when raised to proper height. The rearwardly-projecting arms of the elbow-levers extend into the path of revolving paddle E, Figs. 6 and 4, and are lifted by it against the springs O⁴, pulling the downwardly-projecting arms of the elbow-levers backward and releasing arms J J, which permits the latter to be thrown down by their own weight and by springs J' J'. (Shown in Fig. 1.)

P', Figs. 1 and 4, is a horizontal transverse shaft pivoted in standards P² P², rising from the axletree.

Q Q, Figs. 5 and 7, are pickers fastened rigidly to shaft P'. The outward ends of these pickers are formed to the curve of a circle, having one or more points at the end with a shoulder to each, so that it will pierce a potato or piece of potato, but will be prevented from entering too far by the shoulder. Q', Figs. 4 and 7ᵇ, is a short arm rigidly fastened to shaft P' and arranged to project into the path of revolving paddle E and be pushed down by it to rock the shaft P' and draw the pickers Q Q backward. In this movement the pickers pass between forks Q² Q², Figs. 7 and 7ᵃ, and release the potatoes from the points of the pickers. When the revolving paddle E passes by the arm Q', a spring R on the shaft P' acts to throw the pickers Q Q forward into the potatoes contained in the small hoppers R' R'. When the potato is released from the picker Q by fork Q², as in Fig. 7ᵃ, the potato drops into a tube R² and is conveyed down to the bottom, where it is received upon a gate S. This gate (see Fig. 5) is provided with an elbow-lever S' and is fulcrumed at S². T T are short rods, Fig. 5, pivoted to the elbow-levers S' S' and extending upwardly and jointed to cranks S³ S³, Figs. 5 and 6, on a horizontal rock-shaft S⁴, journaled in bearings in rear of the axletree. This shaft has another crank S⁵, Figs. 4 and 6, connected by rod S⁶ to the rearwardly-extending arm of an elbow-lever O', so that when the paddle lifts the elbow-lever O' it also rocks shaft S⁴ and opens the gate S, letting the potato fall to the ground.

T' T', Figs. 1, 2, 5, and 10, are beams hooked to clevises fastened to cross-bar H² and run backward past the lower ends of tubes R² R². T² T² are opener-shoes fastened to the beams T' T' in order to cut a furrow in the ground in front of the gate S, into which furrow the potato drops when the gate is opened. U U are blades which are fastened to the beam T' and follow behind the gate S and cover the potatoes.

U', Figs. 2 and 5, is a horizontal shaft which turns in brackets U² U², fastened to the axletree A'. V V are short arms rigidly fastened at right angles to the shaft U'. V' V' (see Fig. 2) are rods which are hooked to staples fastened to the beams T' T' and pass upward through trunnion-plates V² with a head or nut above the plate so the rods cannot be pulled back through. W W are springs on rods V' V', the lower ends of which rest on the beams T' T', the upper ends coming up under levers V V.

W', Figs. 5 and 10, is a hand-lever fastened at right angles to shaft U', and which is used to turn the shaft U'. W² is a connecting-bar which connects lever W' to slotted bar D.

X (see Fig. 10) is a double-toothed ratchet fastened to axletree A' and having its upper series of teeth pointing upwardly and its lower series pointing downwardly.

X' is a lever fulcrumed to lever W' at X², the forward end of which has a laterally-projecting detent $t^2$, which works in the lower series of ratchet-teeth when the lever W' is depressed and in the upper series of ratchet-teeth when the lever is raised.

$P^{20}$, Fig. 5, is a drag-bar whose forward end has a slotted connection with the cross-bar H² and whose rear end is connected to a rigid crank-arm $p$ on the shaft U'. There is one of these drag-bars on each side of the machine, and they allow (by virtue of their slots) the shaft U' to be rocked by the upward movement of lever W'; but they limit the downward movement of said lever W'.

Y (see Fig. 1) is a cross-bar on the tongue, which forms a rest for levers J J, (and the other levers attached to the shaft I.)

Y', Figs. 1, 2, and 4, is a horizontal hand-lever fulcrumed at its front end to the tongue at Y² and has a cross-bar Z adapted to alternately support the arms J J to prevent arms J J, I' I', and I² I² from descending too far when not in use. Hand-lever Y' extends to the rear of the machine and can be thrown to right or left, as becomes necessary, against suitable stops, which may be the standards $s\ s$ of rack-bar G. In rear of the machine is the seat $a'$, on which the driver sits.

$A^{20}$, Figs. 1 and 2, is a marker consisting of an arm with a cord and weight Z' at its end, commonly called a "dutchman," which makes a mark for the horses to straddle when coming back across the field. The arm $A^{20}$ is pivoted above the tongue so as to swing to either side. It is reversed when the machine is turned around, and it is held at its outer end in a forked rest $b$ on the cross-bar H².

$b'$ (see Fig. 1) is a small pinion which works in a circular toothed gear $b^3$, fastened to the marker-arm. This pinion is fastened to the front end of shaft $b^2$, which extends to the rear of the machine and has a crank on the same by which the marker is shifted from one side to the other.

*Mode of operation.*—If it is desirable to move the machine without operating it, as in going from house to field, the lever X', Fig. 10, is pressed to lever W', throwing the detent $t^2$ out of gear with ratchet X. Then the lever W' is lifted until the detent will catch on the upper series of ratchet-teeth. This will raise bar D, Fig. 5, and throw the gear-wheel C² out of gear with drive-wheel B, preventing all operation of the machine. It will also raise beams T' T', so that the shoes T² T² and coverers U U will be up, free from the ground. On arriving at the place where the planting is to be done lever W' is reversed and pressed down as far as necessary to plant as deep as desirable, which causes the detent $t^2$, Fig. 10, to engage the lower series of ratchet-teeth to hold the beams down, as shown. Then hand-lever Y', Fig. 1, is moved to the right or left hand, according to the lay of the land to be planted. If it is desired to pass along on the left-hand side of the field to be planted, then the hand-lever Y' is thrown over to the left of the driver, as in Fig. 1. This will permit the apparatus for marking the cross-rows to work on the right-hand side of the driver by removing cross-bar Z from under arm J on right-hand side of the driver and will allow hoe-blade K' on his right to strike the ground to mark the same in check-rows, and vice versa. Then move the hand-wheel F² to the center of axletree, drop a potato in each tube R² for planting first hill, throw the marker A² over to the driver's right hand, as shown, to make a mark for the horses to straddle when coming back across the field, then start the team, and drive straight across the end or side of the field.

*The communication of power.*—When the team is started, power and motion are communicated from drive-wheel B to gear-wheel C², thence to gear-wheel C', turning shaft B', sleeve D', ratchets D² D², and paddle E. Gear-wheel G² (of shaft B') on the left of the driver gives motion to the gear-wheel H on shaft G', and all of this part of the machinery is kept in continuous motion while the team is going, and gear-wheel C² is in gear with drive-wheel B, the other parts being moved in proper time automatically.

*Mode of planting.*—A large hopper R³ to carry potatoes or corn is placed above and between small hoppers R' R', and a gate in the large hopper is so arranged to permit of but few potatoes passing into small hoppers R' R' at once. Paddle E at each revolution trips all the different parts in due time, causing the dropping, the planting, and the marking of cross-rows. Two or more paddles can be used, if necessary, as in planting potatoes or corn close together in rows. The process of picking the potatoes out of the hopper and dropping them into the tube, thence into the ground, and covering them has already been explained. The marking of cross-rows is effected as follows, (see Figs. 1 and 3:) As has been stated, the throwing of hand-lever Y' over to left hand of the driver withdraws cross-bar Z from arm J on the driver's right, as in Fig. 1, and permits spring J' on shaft I on that side to throw hoe-blade K' into the ground with considerable force, going into loose ground about two inches. The machine going forward in the meantime pulls the top of arm J² forward, drawing rod L', with spring L² and the outer arm of elbow-lever M, backward, drawing rod M² and the forward end of lever N to the right of the driver, throwing the back end of lever N into the path of beveled headed pins H', which are fastened in the side of wheel H. The forward part of this wheel is turning upward and over backward, and the back end of lever N is caught by one of the lower pins in wheel H and is lifted to the top. This turns shaft I upward carrying arms I' and J with it. Just before lever N reaches the top of wheel H arm J is brought into engagement with the spring-latch O³, Fig. 8, on the lower forward part of elbow-lever O', arms I' I² being at same time brought up into elevated position. As arm I' is raised blade K' is drawn out of the ground, leaving a mark at right angles to the direction the machine is moving. Then spring K² draws arm J² forward against stop L, as in Fig. 3, releasing the tension on rod L' and other connecting parts to lever N. Then spring O, Fig. 1, pulls on forward part of lever N to the left of the driver and would throw the back part off the pin if it were not for the bevel-head on the pin; but as it is, the bevel-head holds it on the pin until it is carried to the top of the wheel and the pin passes backward out from under it. Then spring O throws lever N out of the path of the pins, and it is ready to be thrown down again, as follows: When revolving paddle E passes under the back of elbow-lever O,' Figs. 6 and 8, it raises it and releases arm J, permitting it to be thrown down again, and then all that part of the machinery attached to shaft I on the right-hand of the driver goes through the same process as before. The parts are so adjusted that the dropping of the potatoes in the two rows is done simultaneously with the dropping or throwing down of blade K', so the three will come in a direct line at right angles with the forward movement of the machine. When the end of the row is reached, the machine is thrown out of gear, as directed heretofore. Then turn the team around and get into position to start back. Throw the machine into gear again, change the marker over to the left-hand side of the driver, and throw hand-lever Y' over to the right-hand side. If the machine is not in position to bring the starting of the planting in direct line with that which has been planted, regulate or adjust it by turning paddle E forward as far as necessary to bring it in line. The machine is now ready to start back. The throwing of lever Y' to the right causes that part of the marking apparatus which is on the left side to operate the same as that which is on the right had been operating before turning around, and it leaves that part on the right so that blade K' will pass just above the marks it made when going through the other way, and if the planting is being done just when blade K' on the right is directly over the marks it had previously made it is planting correctly in line; but if it should be in advance, as might happen from unevenness of the ground or other causes the operator takes hold of hand-wheel F² and turns it to the right. This will throw the revolving paddle E back, bringing the planting in line; but if the planting is behind time the hand-wheel is turned to the left.

If it is desired to plant the rows closer together, the levers V V on shaft U' are adjusted closer together, and vice versa. If it is desired to plant the hills closer together in the rows, a smaller wheel is substituted for the gear-wheel C', and vice versa.

For planting corn substantially the same mechanism is used, the only modification being in the devices which lift a definite quantity of corn-grains from the small hoppers R' and drop them into the spouts. Such modification of these devices are shown in Figs. 9, 9ª, 9ᵇ, in which P' is the rock-shaft, R its spring, and Q' its tappet-arm, which is acted upon by the paddle to rock the shaft, all as shown in Figs. 7, 7ª, 7ᵇ.

The pointed potato-picker Q and the dislodging-fork Q² are dispensed with, and in their places I attach to the shaft P' the arms Q³, having at their outer ends a fork Q⁴, between whose branches is pivoted a small transfer-bucket Q⁵, that holds the proper quantity of corn to go in each hill. This bucket has a compound motion. It is projected into the hopper R' to be filled with corn by a radial sweep of the arm Q³, is then withdrawn, and as it reaches its highest point is tilted to dump its charge of grain into the spout. To guide this bucket in these movements, a curved and stationary runway Q⁶ is arranged at each end of the shaft and is formed with curved slots on its flanged sides, through which slots a pin Q⁷ passes, which is fastened to ears or lugs on the upper end of the bucket. When the forked arms Q³ raise the bucket, the open end of the bucket remains at the top until the pin Q⁷ reaches the upper ends of the slots, and then the further upward movement of the arm tilts the bucket on its pin Q⁷ and by inverting the bucket drops its contents through a hole in the runway into the spout, as shown in dotted lines, Fig. 9. The bucket Q⁵ has an adjustable bottom regulated by a set-screw Q⁸, so that its capacity may be increased or diminished to plant a larger or smaller number of grains to the hill, as may be desired.

In carrying out my invention I may make various minor changes without departing from the spirit of the invention. Thus, for instance, instead of a spiral groove B² in the shaft B', coöperating with a sliding key on the sleeve D', I may make the shaft B' with a spiral thread or flange $f$, as seen in Fig. 6ᵇ, the sleeve D' being formed with a corresponding groove or notch to receive it, so as to give the requisite rotary adjustment when the sleeve is moved longitudinally along the shaft.

Having thus described my invention, what I claim as new, and desire to secure by Letters Patent, is—

1. In a planter, the combination with a rock-shaft having a tappet-arm, and intermittently-acting devices for planting in hills;

of a revolving paddle arranged parallel to the rock-shaft within range of the tappet-arm, said paddle being provided with means for adjusting it both circularly and longitudinally to regulate the timing of its action as described.

2. In a planter, the combination with a rock-shaft having a tappet-arm, and dropping devices operated by the rock-shaft; of a revolving paddle arranged parallel to the rock-shaft within range of the tappet-arm, said paddle being provided with means for adjusting it both circularly and longitudinally to regulate the timing of the dropping devices substantially as described.

3. In a planter, the combination with a continuously-rotating shaft having pin-wheels and check-row-marking devices operated by the pin-wheel; of a revolving paddle arranged parallel to the said shaft and tripping devices arranged within range of the paddle, said paddle being provided with means for adjusting it both circularly and longitudinally to regulate the timing of the marking devices substantially as described.

4. In a planter, the combination with a rock-shaft having a tappet-arm and intermittently-acting planting devices; of a revolving paddle arranged parallel to the rock-shaft within range of the tappet-arm and carrying pawls at its ends, a sleeve with ratchet-wheels at its ends engaging the pawls of the paddle, a shaft passing through the sleeve and having sliding spiral connection therewith and means for moving this sleeve longitudinally as described.

5. In a planter, the combination with a rock-shaft having a tappet-arm and intermittently-acting planting devices; of a revolving paddle arranged parallel to the rock-shaft within range of the tappet-arm, a sleeve, means for adjustably connecting the sleeve and paddle and a shaft passing through the sleeve and having a sliding spiral connection therewith substantially as described.

6. In a planter, the combination with a rock-shaft having a tappet-arm and intermittently-acting planting devices; of a revolving paddle arranged parallel to the rock-shaft within range of the tappet-arm, a sleeve, means for adjustably connecting the sleeve and paddle, a shaft passing through the sleeve and having a sliding spiral connection therewith, a bail embracing the shaft at opposite ends of the sleeve, a gear-wheel mounted on an axis on the bail and a stationary rack-bar engaging said gear-wheel substantially as shown and described.

7. In a planter, the combination of two horizontally-alined rock-shafts arranged at the front of the machine and bearing each three rearwardly-projecting arms, the outer one of which is provided with an articulated marker-hoe, a pivoted lifting-lever arranged on the middle arm, a wheel with lifting-pins for said lever, means for tripping the lever by the articulated hoe and means for alternately holding up the inner arms of each shaft substantially as shown and described.

8. In a planter, the combination with the articulated marker-hoe its supporting-arm and horizontal rock-shaft arranged in front of the machine and operating said hoe; of a rearwardly-projecting arm fixed to said rock-shaft at the inner end of the same, an elbow-lever having a downwardly-projecting arm with a latch adapted to catch and hold the rock-shaft arm, said elbow-lever having also a rearwardly-projecting arm and a revolving paddle arranged to strike the rearwardly-projecting arm of the elbow to disconnect its downwardly-projecting arm from the rock-shaft arm and drop the marker-hoe substantially as described.

9. In a planter, the combination with a front cross-bar $H^2$; of two alined rock-shafts $I'$ bearing rigidly-attached and rearwardly-projecting arms $J, I', I^2$, the articulated hoes $J^2$ having spring and stop, the pull-rod $L^2$ with elbow-lever M and rod $M^2$, the lifting-lever N fulcrumed to the middle arm $I^2$, the rotary shaft with pin-wheels H, the holding and tripping lever $O'$ for the inner arms of the rock-shaft and a horizontally-swinging hand-lever $Y'$ pivoted at its front end and carrying a cross-bar Z adapted to hold one arm J up and allow the other one to drop to operative position according to the adjustment of the swinging lever substantially as described.

10. In a planter, a check-row-marking hoe having an articulated joint with spring, engaging mechanism for lifting and dropping the hoe, and means for setting into action the lifting devices for the hoe by the advance of the machine and the rearward deflection of the articulated hoe from its hold in the earth substantially as described.

11. In a planter, the combination with the dropping devices and the spout therefor; of a gate arranged at the bottom of the spout, an elbow-lever, a rod connecting therewith a crank-shaft bearing cranks connected to the said rod and a second crank with upwardly-extending rod, an elbow-lever having its rear end connected to the last-named rod and a paddle revolving under the said elbow-lever and arranged to operate the same and at the same time to operate the gate substantially as described.

12. In a planter, the combination with the planting devices; of the beams carrying the opener-shoe and coverers, a rod extending upward from the beam and having a spiral spring around it, a trunnioned cap above the spring and a head above this cap, a rock-shaft bearing crank-arms carrying the trunnioned caps, a rigid hand-lever with spring-actuated locking-bar and a double series of ratchet-teeth having the upper portion of teeth pointing upwardly and the lower series of teeth pointing downwardly to hold the lever and beams either up or down as described.

13. In a planter, the combination with the main wheel; of a rigidly-attached gear-wheel B, a continuously-rotating shaft bearing gear-wheel C', a slotted bar D bearing intermediate gear-wheel $C^2$, a bar $W^2$ connected to bar D, a hand-lever W' connected to bar $W^2$, a spring-actuated locking-bar, a rock-shaft rigidly attached to the hand-lever and bearing the opener-beams, and a double series of ratchet-teeth, the upper series engaging the locking-bar to hold the opener-beams up and the gear-wheel $C^2$ disengaged, and the lower series engaging the locking-bar to hold the opener-beams down and the gear-wheel $C^2$ engaged substantially as described.

14. A planter comprising the constantly-running shaft B' with sleeve D' and paddle E mounted on the same, the paddle being adjustable on the sleeve, and the sleeve having both a circular and longitudinal adjustment on the shaft, a bail embracing the sleeve and provided with rack and gear for adjusting it longitudinally, the constantly-running shaft G' geared to shaft B' and having pin-wheels H, the intermittent rock-shaft P' with tappet-arm projecting into range of the paddle and having feeding devices and check-row-marking devices substantially as shown and described.

15. In a planter, a constantly-rotating shaft having a tappet connection made spirally adjustable on the shaft substantially as and for the purpose described.

16. In a planter the combination of a shaft and a sleeve on the shaft having a spirally-adjustable connection therewith, ratchet-wheels fastened at each end of the sleeve, a paddle adjustable on the sleeve, a bail embracing the sleeve and provided with a rack and a gear for longitudinal adjustment substantially as described.

WILLIAM A. HALL, Sr.

Witnesses:
J. H. DOOLEY,
S. H. DOOLEY.